No. 707,319. Patented Aug. 19, 1902.
H. W. HALES.
PHOTOGRAPHIC CAMERA.
(Application filed Sept. 5, 1901.)
(No Model.) 3 Sheets—Sheet 1.
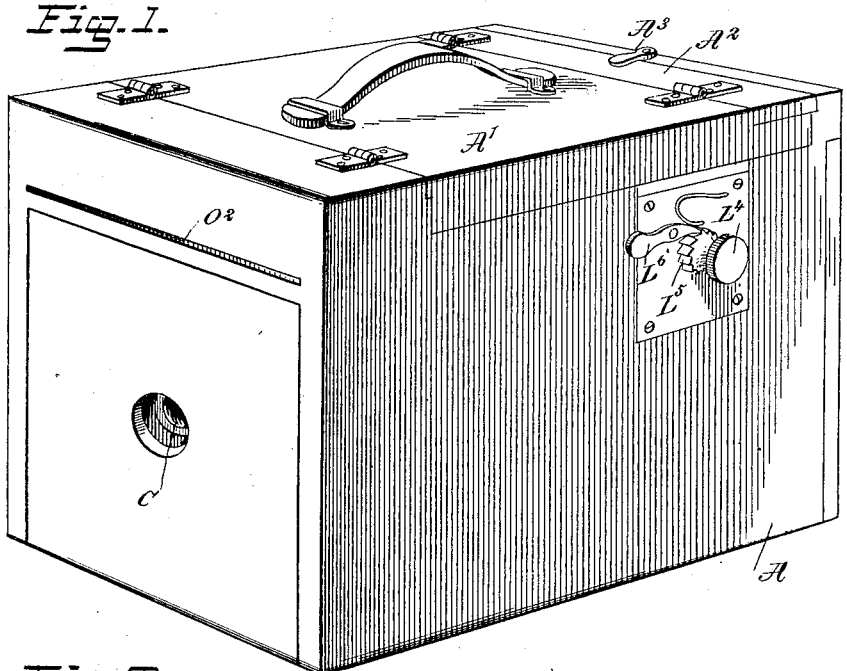
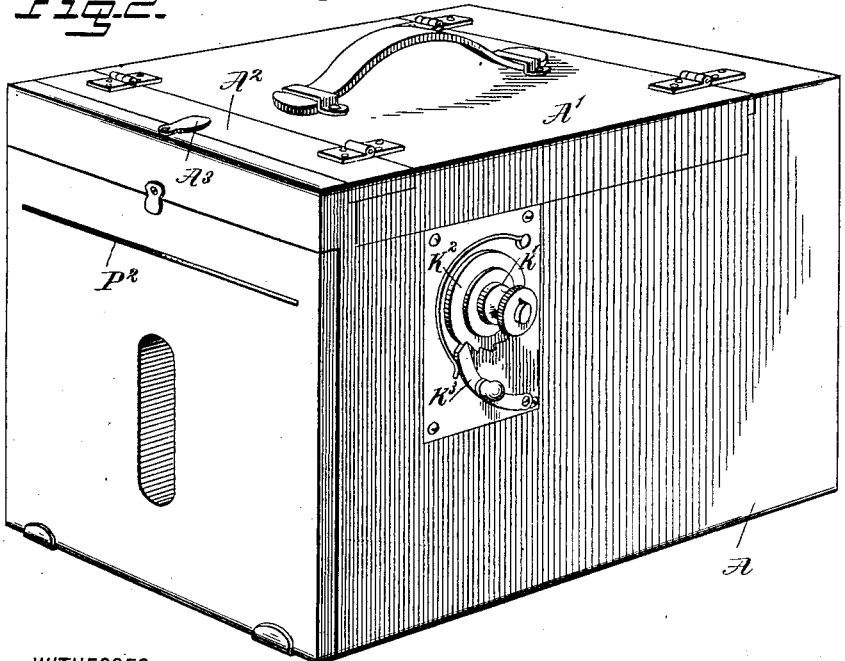
WITNESSES:
INVENTOR
Henry W. Hales.
BY
ATTORNEYS

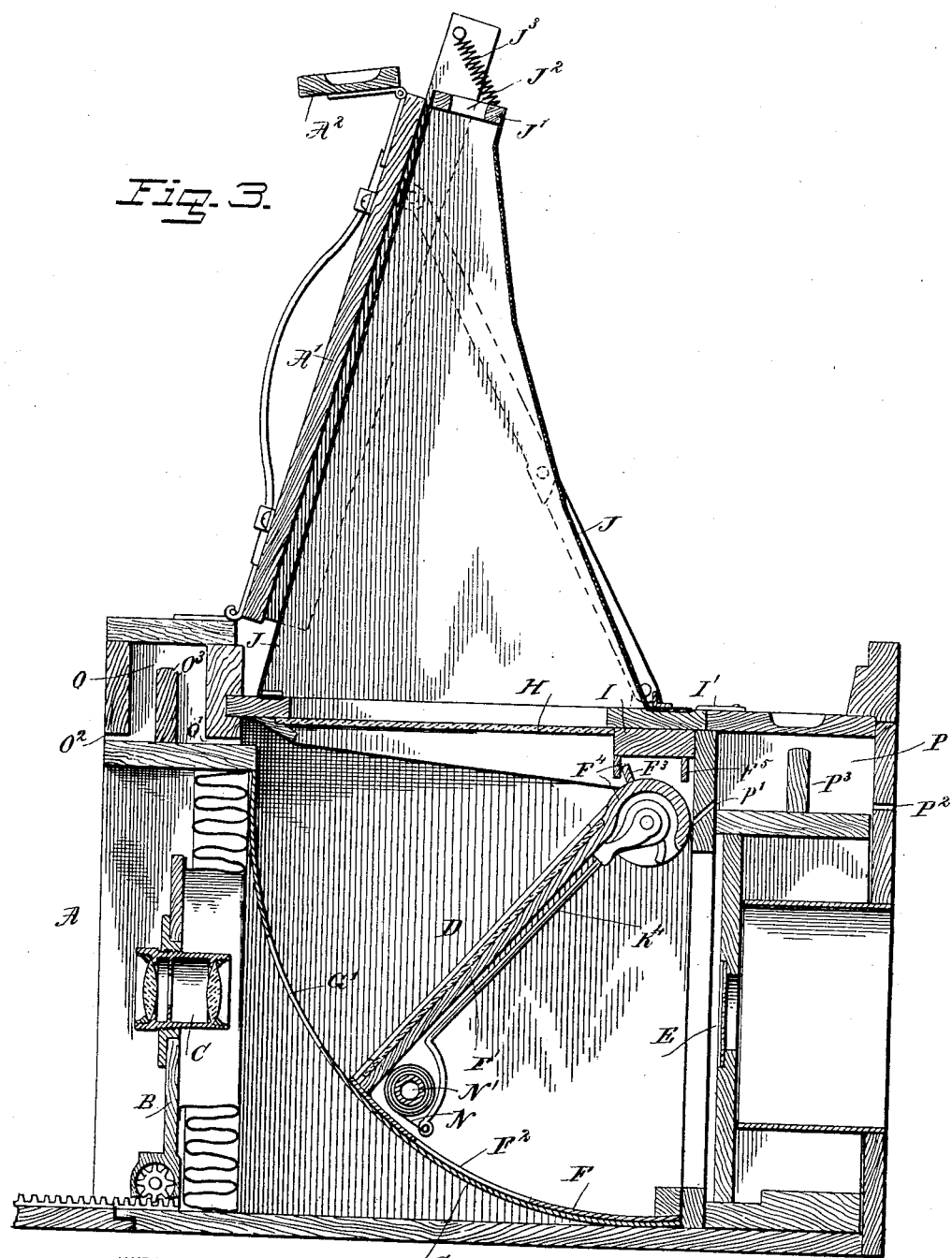

No. 707,319. Patented Aug. 19, 1902.
H. W. HALES.
PHOTOGRAPHIC CAMERA.
(Application filed Sept. 5, 1901.)
(No Model.) 3 Sheets—Sheet 3.
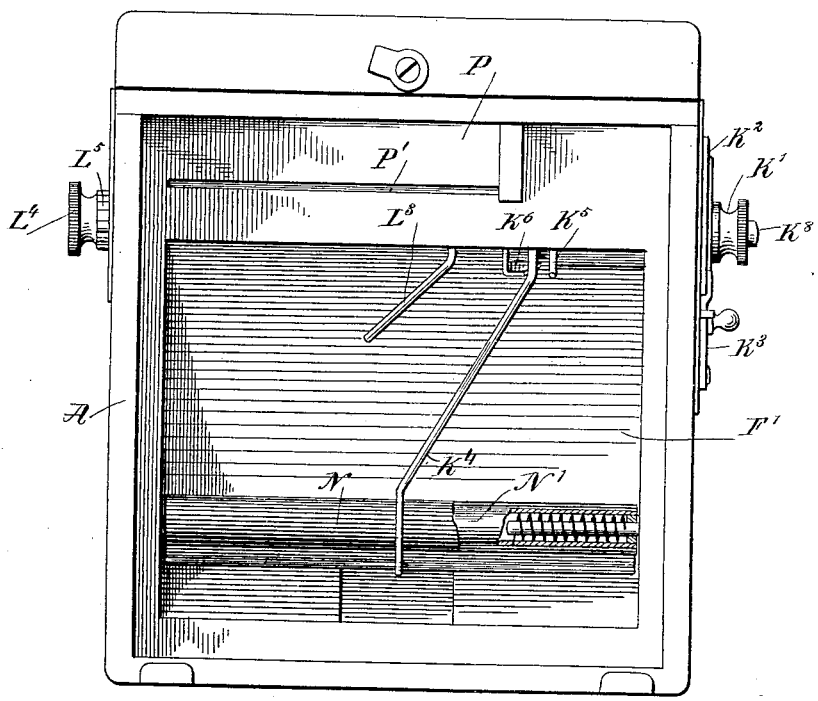
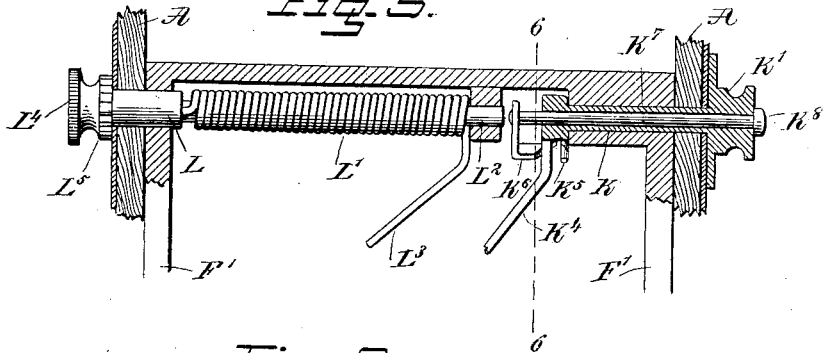
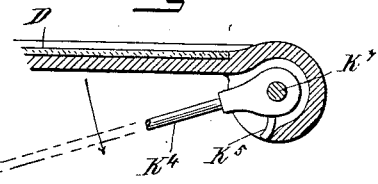
WITNESSES:
INVENTOR
Henry W. Hales.
BY
ATTORNEYS

UNITED STATES PATENT OFFICE.

HENRY W. HALES, OF RIDGEWOOD, NEW JERSEY.

PHOTOGRAPHIC CAMERA.

SPECIFICATION forming part of Letters Patent No. 707,319, dated August 19, 1902.

Application filed September 5, 1901. Serial No. 74,387. (No model.)

*To all whom it may concern:*

Be it known that I, HENRY W. HALES, a citizen of the United States, and a resident of Ridgewood, in the county of Bergen and State of New Jersey, have invented a new and Improved Photographic Camera, of which the following is a full, clear, and exact description.

The invention relates to photographic cameras having a movable mirror in front of the sensitized plate to reflect the image onto a ground glass arranged in the top of the camera.

The object of the invention is to provide a new and improved photographic camera which is simple and durable in construction, cheap to manufacture, easily manipulated, and arranged to insure positive and quick mechanical action and allowing the aperture of the shutter to be varied without opening the camera in any way.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a front perspective view of the improvement. Fig. 2 is a rear perspective view of the same. Fig. 3 is a longitudinal sectional elevation of the same with the parts in position for focusing. Fig. 4 is a rear end view of the same with the back of the casing and the plate or film holder removed, parts being shown in section. Fig. 5 is a transverse section of the fulcrum end of the shutter and adjacent parts; and Fig. 6 is an enlarged sectional side elevation of the adjusting device for the safety-curtain, the section being on the line 6 6 of Fig. 5.

In cameras as heretofore constructed and using the mirror as the shutter frequent leakage of light occurs, and it is impossible to obtain the desired shutter speed for instantaneous work, owing to the air within the camera-casing forming air-cushions to retard the movement of the shutter. In cameras having a lever mechanism to move the mirror and a focal plane or a curtain-shutter to uncover the sensitized plate or film it is necessary that the lever mechanism shall have its movement finished before the shutter starts, and consequently such camera is unreliable and produces an uncertainty liable to destroy the confidence of the operator. In my camera, presently to be described in detail, the above-mentioned and other defects are overcome, all leakage of light is prevented, the speed of the shutter is regulated, and the action of the various parts is positive and quick, so as to insure the best results.

In the camera-casing A is adjustably mounted a suitable lens-frame B, carrying the lens C for throwing the image onto a mirror D and onto the sensitized plate or film E, as hereinafter more fully described. The mirror D is secured on an arm $F'$ of a segmental shutter F, having an aperture $F^2$ adapted to register with an aperture $G'$, formed in a segmental transverse partition G, secured to the sides of the camera-casing A. The aperture $G'$ is in alinement with the lens C to allow the rays of light admitted by the lens to pass to the mirror D when the shutter is in a closed position, as shown in Fig. 1; but when the shutter is in a set or open position and moves into a closed position then the aperture $F^2$ passes over and for a time registers with the aperture $G'$, and the rays of light admitted by the lens C now pass to the sensitized plate or film E. The image thrown on the mirror D is reflected on the ground glass H, secured in a frame I, removably held in the top of the camera-casing A and adapted to be locked thereto by a suitable fastening device $I'$. A hood J, of a flexible material, is secured to the top of the frame I and has its outer end provided with a plate $J'$, having two eyeholes $J^2$ to allow the operator to view the image thrown onto the ground glass H. The plate $J'$ is hung on springs $J^3$, attached to the cover $A'$ of the camera-casing A, the said cover having its forward end hinged to the casing and its rear end provided with a hinged extension $A^2$, adapted to be swung forward and downward to give the operator free access to the plate $J'$. When the camera is not in use, the cover $A'$ is swung downward and rearward, so that the hood J folds on top of the frame I, and the cover is then locked in place by a suitable fastening device $A^3$. (See Fig.

1.) When the cover A' is in a folded or closed position, the plate J' is relieved from the tension of the walls of the hood J, so that the springs $J^3$ are in a relaxed position, and hence do not deteriorate. When the cover A' is swung upward, the walls of the hood in unfolding pull on the eyeplate J', and thereby place the springs $J^3$ under tension, it being understood that the said eyeplate is free to move, as it is not hinged or similarly fastened to the cover. The cover A' is held in an extended position by a suitable folding brace $A^3$. (Shown in dotted lines in Fig. 3.) The shutter-arm F' is mounted to turn loosely on a sleeve K, which is mounted to turn in suitable bearings formed in one side of the case A, (see Figs. 2 and 5,) the said arm F' also having a loose bearing on a shaft L, likewise journaled in the casing A on the side opposite the one carrying the sleeve K. On the shaft L is secured a spring L', coiled on a reduced portion $L^2$ of the said shaft, the free end $L^3$ of the spring pressing against the rear face of the shutter-arm F' to normally swing the shutter upward into an exposing and cut-off position—that is, to move the aperture $F^2$ over and past the aperture G'—for making the exposure. The up-and-down swinging movement of the shutter F is limited by stops $F^4$ $F^5$, adapted to be engaged by a stop-lug $F^3$ on the fulcrum end of the shutter. (See Fig. 3.) The tension of the spring L' can be regulated to increase or decrease the speed of the shutter F, and for this purpose the outer end of the shaft L is provided with a knob $L^4$, adapted to be taken hold of by the operator for turning the shaft to increase or decrease the tension of the spring L'. When the desired adjustment has been made, the shaft L is locked in place, and for this purpose the shaft is provided with a ratchet-wheel $L^5$, engaged by a spring-pressed lever $L^6$, (see Fig. 1,) fulcrumed on the outside of the casing. The shutter F is set by hand into the closed or lowermost position, (shown in Fig. 3,) and for this purpose the outer end of the sleeve K is provided with a knob K', adapted to be taken hold of by the operator to turn the sleeve K, and on the inner end of the sleeve is fastened a pin $K^5$, adapted to engage the fulcrum end of the shutter F to impart the desired swinging motion to the arm F' and shutter F. In order to lock the shutter in a set position, the sleeve K is provided adjacent to the knob K' with a plate $K^2$, having three notches adapted to be engaged by a spring-pressed pawl $K^3$, fulcrumed on the side of the casing (see Figs. 2 and 4) and under the control of the operator to move the pawl out of engagement with the notched plate $K^2$ whenever it is desired to unlock the shutter F and allow the same to swing into an exposure position by the action of the spring L'. The pawl $K^3$ engages the end notches in the plate $K^2$ at the time the shutter is in an open or closed position, and when it is desired to make a time exposure the knob K' is turned until the pawl $K^3$ engages the middle notch, the shutter then standing in position with its aperture $F^2$ in register with the aperture G'.

On the inner end of the sleeve K is secured an arm $K^4$, extending downwardly at the back of the arm F', and on the free end of this arm $K^4$ is secured one end of a safety curtain or apron N, winding and unwinding on a spring-pressed roller N', journaled in the sides of the arm F', as plainly indicated in Fig. 4. It is understood that when the knob K' is turned by the operator the pin $K^5$ turns the shutter after an initial movement has been given to the curtain N and the latter has moved across the aperture $F^2$, so that the shutter F swings into a lowermost or set position after the curtain N has been drawn over the aperture $F^2$. The curtain N thus closes the opening $F^2$ previous to starting the shutter F for resetting it—that is, before the aperture $F^2$ begins to move in register with the aperture G'—so that the rays of light admitted by the lens C are cut off from the sensitized plate or film during the time the aperture $F^2$ passes over the aperture G' on the downward movement of the shutter. The curtain N is also used to regulate the size of the shutter-aperture $F^2$, and for this purpose the arm $K^4$ is adapted to be engaged by a cam $K^6$ to swing the arm rearwardly and move the curtain N the desired distance over the aperture $F^2$. The cam $K^6$ is held on the inner end of a shaft $K^7$, extending loosely through the sleeve K, and on the outer end of the shaft $K^7$ is secured a knob $K^8$, adapted to be taken hold of by the operator to rotate the shaft $K^7$, and with it the cam $K^6$, to shift the position of the arm $K^4$, and consequently move the curtain N to the desired position relative to the aperture $F^2$. Thus it will be seen that the curtain N can be adjusted to increase or decrease the aperture $F^2$, and this movement is accomplished independent of the knob K'.

In order to relieve the shutter F of air-pressure when moving either into an open or a closed position, I provide air-chambers O and P, preferably arranged at the top of the casing A, at the front and rear ends thereof, as plainly indicated in Fig. 3. The air-chamber O is provided with an inlet-opening O', leading into the camera-casing in front of the shutter-arm F', so that when the shutter moves into an open position the air in front of the shutter F and mirror D passes through the opening O' into the chamber O and then escapes through an opening $O^2$ in the front of the chamber to the outside. In order to prevent light from passing through the camera O and opening O' to the interior of the casing, I provide the said chamber O with a transverse partition $O^3$, rising from the bottom of the chamber to within a short distance of the top thereof, as plainly indicated in Fig. 3. The air-chamber P is similarly constructed—that is, is provided with an air-inlet opening P', leading into the casing in the rear of the shutter D, so that when the latter moves into a closed position the air passes from the casing through the opening P' into the chamber P and from the latter through the opening P² to the outside. The air-chamber P is also provided with a transverse partition P³ for the same purpose as the partition O³, previously mentioned. The air escapes rapidly from the shutter-chamber until the shutter has nearly completed its movement; but, as the shutter passes the passage o', it is cushioned by the body of air confined between it and the side of the chamber and is thus prevented from striking too hard.

The operation is as follows: When it is desired to focus, the operator swings the cover A' into an uppermost position, as plainly illustrated in Fig. 3, and turns the knob K' to swing the shutter F into a closed position, as indicated in the said Fig. 3. The reflected image can now be viewed by the operator through the eye-openings J², and the necessary focusing is now done in the usual manner by the operator moving the lens-frame B and lens C correspondingly forward or backward. As soon as the desired focusing has been done and it is desired to make the exposure the operator swings the pawl K³ out of engagement with the notched plate K², so that the shutter is released and immediately swings forwardly and upwardly by the action of the spring L' to pass the aperture F² over the aperture G'. The exposure is now made for a certain length of time, according to the tension of the spring L'. To reset the shutter, the knob K' is again turned to first cause the curtain N to move over the aperture F² and close the same and then swing the shutter F back into the set lowermost position. (Shown in Fig. 3.)

From the foregoing it is evident that the curtain N has an initial movement relative to the shutter F to positively prevent any rays of light passing to the sensitized plate or film after the exposure has been made and the shutter is reset. It is understood that when the operator has turned the shutter F into a set position and locked it therein by the pawl K³ engaging the notched plate K² and releases the knob then the safety-curtain N immediately winds up on its roller N', owing to the spring therein, thus bringing the arm K⁴ and knob K' back to a normal position.

In further explanation of the operation I will state that when the cover A' is folded the eyepiece J' slides outward parallel to the cover without changing its angle relative to the latter and also without folding upon the hood, and when the cover is raised the eyepiece is retracted or slides backward, so that the springs resisting serve to stretch the hood while the eyepiece is held in viewing position. Thus the eyepiece requires no manual manipulation when the cover is raised or closed, but is carried automatically from one position to the other and in so doing remains at the same angle to the cover.

Having thus described my invention, I claim as new and desire to secure by Letters Patent—

1. A photographic camera, having a movable combination mirror and shutter, and an air-chamber located at one side of the shutter-pivot and having a passage that communicates with the mirror and shutter chamber, for relieving air-pressure when imparting a swinging motion to the mirror and shutter, as set forth.

2. A photographic camera having a pivoted swinging shutter, and an air-outlet chamber O located as shown and provided with a passage o' that communicates with the shutter-chamber at a point below the limit of movement of the shutter as shown, whereby the air issues rapidly in the initial movement of the shutter but a portion is confined between the shutter and the side of the chamber just before the movement of the shutter is completed, as shown and described.

3. A photographic camera, having a movable shutter, and air-chambers opening to the outside for relieving the shutter of air-pressure when moving the shutter into an open or a closed position, as set forth.

4. A photographic camera, having a movable shutter, and air-chambers opening to the outside for relieving the shutter of air-pressure when moving the shutter into an open or a closed position, the said air-chambers having means for preventing rays of light from passing to the interior of the camera-casing, as set forth.

5. A photographic camera, having a movable shutter, and a safety-curtain for the shutter, which is extensible and attached to the outer end of the shutter and has an initial movement relative to that of the shutter, as set forth.

6. A photographic camera, having a movable shutter, and a safety-curtain for the shutter, which is attached to the outer end of the shutter and extensible as specified and arranged to regulate the size of the shutter-opening, as set forth.

7. A photographic camera, having a swing-shutter, a mirror carried thereby, a safety-curtain carried by the said swing-shutter and supported and arranged transversely on the outer end of the shutter and adapted for extension as specified, and means for moving the safety-curtain into a closed position previous to starting the said shutter, as set forth.

8. A photographic camera, having a swing-shutter, a mirror carried thereby, a safety-curtain carried by and arranged transversely upon the outer free end of the swing-shutter, means for moving the safety-curtain into a closed position previous to starting the said shutter, and to release the safety-curtain at the option of the operator after the shutter is moved into a set position, as set forth.

9. A photographic camera, comprising a casing having a segmental apertured partition, a segmental swing-shutter in the said casing and having its aperture adapted to register with the aperture in the partition, and an adjustable safety-curtain carried by the said shutter and arranged transversely upon the outer free end of the shutter and adapted for independent adjustment thereon to allow of regulating the size of the shutter-aperture, as set forth.

10. A photographic camera, comprising a casing having a segmental apertured partition, a segmental swing-shutter in the said casing and having its aperture adapted to register with the aperture in the partition, an adjustable safety-curtain carried by the said shutter and independently adjustable thereof to allow of regulating the size of the shutter-aperture, and means for imparting an initial movement to the curtain previous to swinging the shutter into a set position to close the shutter-opening while moving the shutter into a set position, as set forth.

11. A photographic camera, having a spring-pressed swing-shutter, a sleeve on which the shutter is mounted to swing loosely, the sleeve having an arm for imparting a swinging motion to the shutter, a safety spring-roller curtain journaled on the shutter, and an arm carried by the said sleeve and connected with the said curtain, as set forth.

12. A photographic camera, having a spring-pressed swing-shutter, a sleeve on which the shutter is mounted to swing loosely, the sleeve having an arm for imparting a swinging motion to the shutter, a safety spring-roller curtain journaled on the shutter, an arm carried by the said sleeve and connected with the said curtain, and a cam device under the control of the operator for setting the said arm and sleeve, as set forth.

13. In a photographic camera, the combination, with the casing and the cover hinged thereto, of a hood formed of flexible material and an eyepiece which is secured to its outer edge and free from and movable independently of the cover, and springs connecting the eyeplate with the cover and serving as the sole support for the eyepiece and means for stretching the hood, as shown and described.

14. In a photographic camera, the combination, with the movable cover and flexible focusing-hood provided at its outer end with an eyepiece which is adapted to slide parallel to the cover, of yielding supports for said eyepiece which are connected with the free end of the cover whereby the said parts are adapted to operate as shown and described.

In testimony whereof I have signed my name to this specification in the presence of two subscribing witnesses.

HENRY W. HALES.

Witnesses:
 THEO. G. HOSTER,
 EVERARD B. MARSHALL.